United States Patent [19]

Weeks

[11] 3,786,590
[45] Jan. 22, 1974

[54] FISHING ROD RETRIEVING DEVICE

[76] Inventor: Closter G. Weeks, Box 54, Qulin, Mo. 63961

[22] Filed: May 30, 1972

[21] Appl. No.: 257,948

[52] U.S. Cl. .......................................... 43/25, 9/321
[51] Int. Cl. ............................................. A01k 87/00
[58] Field of Search ..................... 43/25; 9/321, 325

[56] References Cited
UNITED STATES PATENTS
2,190,531   2/1940   Kaboskey .............................. 43/25
2,903,718   9/1959   Wright ................................... 43/25
3,393,983   7/1968   Washington ...................... 9/321 X

*Primary Examiner*—Louis G. Mancene
*Assistant Examiner*—Robert F. Cutting

[57] ABSTRACT

A device for attachment to a fishing rod in order that it will automatically float to the surface if lost overboard. This device consists primarily of a cylinder with clamp means for the rod and having a self-contained balloon with chemical means within the cylinder and will put a gas in the balloon upon contact with water.

4 Claims, 3 Drawing Figures

PATENTED JAN 22 1974 3,786,590

FISHING ROD RETRIEVING DEVICE

This invention relates to floatation devices, and more particularly to a fishing rod retrieving device.

It is therefore the primary purpose of this invention to provide a fishing rod retrieving device which will be attached to a fishing rod so as to cause the fishing rod if accidentally dropped into the water.

Another object of this invention is to provide a device of the type described which will be basically, a cylinder filled with a chemical such as calcium car-bide which upon contact with water, will produce a gas which will fill a balloon attached to the device, the balloon causing the necessary floating action for the fishing rod to return to the surface in order to be retrieved.

Another object of this invention is to provide a device of the type described which will have water inlet means at one end of the cylinder, which will be adjacent to a reed type valve, the valve serving to prevent the gas from flowing out of the cylinder, except into the balloon.

A further object of this invention is to provide a device of the type described which will have a check valve on the balloon, thus preventing the escape of the gas therefrom.

A still further object of this invention is to provide a device of the type described which will have external clamp means for clamping the cylinder to the fishing rod.

Other objects of the present invention are to provide a fishing rod retrieving device which is simple in design, inexpensive to manufacture, rugged in construction, easy to use and efficient in operation.

These and other objects will be readily evident upon a study of the following specification and the accompanying drawing wherein.

Figure 1:
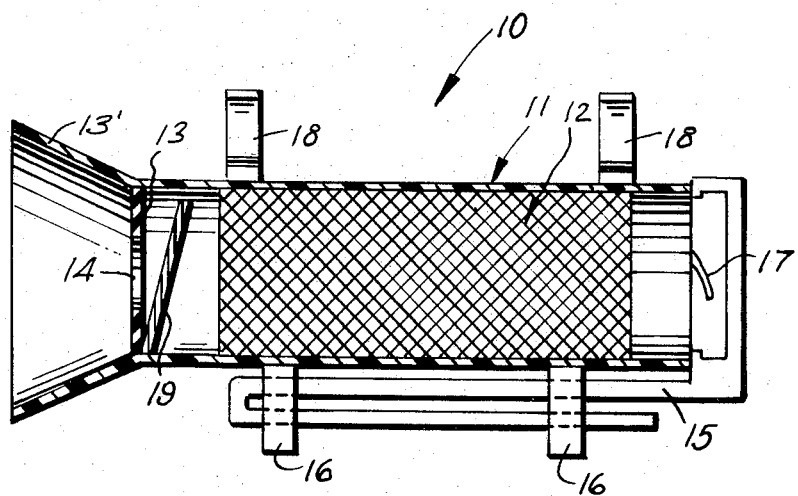
FIG. 1 is a cross sectional view taken along the line 1—1 of FIG. 2.

According to this invention, a fishing rod retrieving device 10 is shown to include a hollow plastic cylinder 11 containing a cylindrical screen 12 therein, the screen 12 serving to house the calcim carbide or other suitable gas producing chemical. Cylinder 11 is provided with a partition wall 13 having a central opening 14 which serves as interseams for water. The partition walls 13 is positioned at the small diameter end of the flared end 13' which is fully open for unrestricted flow of water.

A balloon 15 in its collapsed state, is secured to the opposite end of cylinder 11 and the expandable portion is carried within a pair of clips 16 fixedly secured to the outer periphery of cylinder 11. Balloon 15 includes a check valve 17 which serves to prevent the gas from escaping from balloon 15 when device 10 is activated while the chemical and water when the fishing rod (not shown) falls into the water. Oppositely opposed on cylinder 11 and spaced apart are a pair of clamps 18 which serve to clampingly engage the fishing rod so as to render device 10 stationary thereon.

Device 10 also includes a round reed valve 19 which serves to close off the opening 14 after the gas has been produced to fill balloon 15, thus enabling the gas to flow only in one direction, that being into the balloon 15 so as to inflate it in order to bring the fishing rod to the surface in order to be retrieved.

Figures 2, 3:
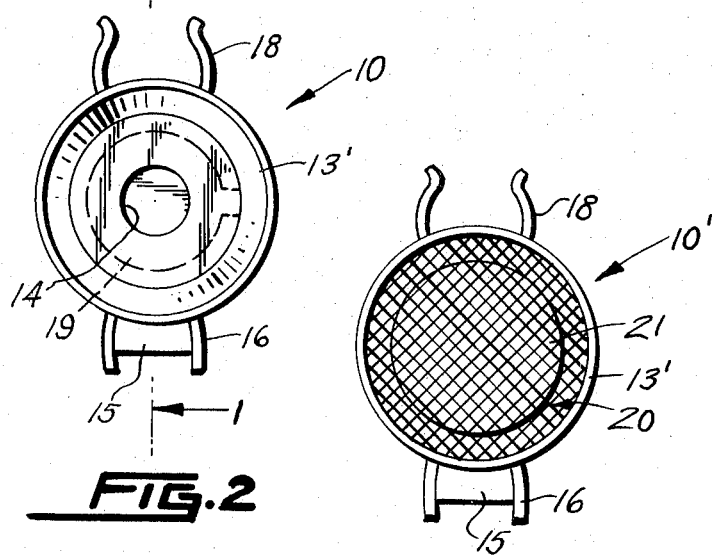
FIG. 2 is an enlarged view of the present invention showing the front end where water enters the device.
FIG. 3 is an end view showing a modified form of the invention.

Referring now to FIG. 3 of the drawing, one will see a modified form of fishing rod retrieving device 10' having an inlet screen member 20 at the rim of the flared end 13' and device 10' includes a gas cut off valve 21 which serves to prevent the escape of gas from the flared end 13' when device 10' is activated.

What I now claim is:

1. A fishing rod retrieving device, com-prising a plastic cylinder, a screen carried at one end of said cylinder providing container and a balloon at its opposite end for a chemical, for example, calcium carbide which is used to inflate said balloon carried by said cylinder, a partition wall carried in said cylinder providing opening means for the entrance of water to contact said calcium carbide, a round reed valve carried within said cylinder serving as gas shut off means, clip means carried by said cylinder for holding said balloon in its collapsed state until it is inflated, clamp means carried by said cylinder providing attachment means to said cylinder to a fishing rod, check valve means carried within said cylinder enabling said gas to remain within the inflated balloon when said device is activated.

2. The combination according to claim 1, wherein said screen within said cylinder is of cylindrical configuration and serves as housing means for said calcium carbide and said screen is secured fixedly within said cylinder between the valve end of the balloon device and the gas shut off valve.

3. The combination according to claim 2, wherein said cylinder has fixedly secured within its inner periphery at one end, said partition wall which is adjacent to the flared end of said cylinder, said partition wall having opening means for the entrance of water to contact said calcium carbide within said screen of said cylinder and said reed valve is adjacent to said partition wall and serves as gas shut off means when said water contacts said calcium carbide thus preventing the escape of said gas from said flared end and thus allowing said gas to enter into the check valve portion of said balloon of said device.

4. The combination according to claim 3, wherein said valve portion of said balloon is carried at the opposite end of said flared end of said cylinder on the interior of said cylinder and said gas enters said valve when said fishing rod falls into the water and said balloon is inflated by said gas and thus causes said rod to be carried to the surface of said water in order to be retrieved by the user and said clamps of said device are secured fixedly to the outer periphery of said cylinder and springly engage said fishing rod thus rendering said device secure thereto and on the opposite side of said cylinder, spaced apart clip means serves to hold the uninflated balloon and then said balloon is inflated by said gas produced by said chemical, said balloon expands and falls away from said clip, said balloon also serving as marker means for observing the location of said rod which is floated upwards to the surface of said water by said device.

* * * * *